US010942481B2

(12) United States Patent
Hamasaki

(10) Patent No.: US 10,942,481 B2

(45) Date of Patent: Mar. 9, 2021

(54) IMAGE FORMING APPARATUS

(71) Applicant: CANON KABUSHIKI KAISHA, Tokyo (JP)

(72) Inventor: Ryuji Hamasaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 350 days.

(21) Appl. No.: 16/136,081

(22) Filed: Sep. 19, 2018

(65) Prior Publication Data

US 2019/0094784 A1 Mar. 28, 2019

(30) Foreign Application Priority Data

Sep. 28, 2017 (JP) ................................ 2017-187433
Jul. 26, 2018 (JP) ................................ 2018-139976

(51) Int. Cl.

*G03B 15/00* (2006.01)
*B65H 7/14* (2006.01)
*G03G 21/16* (2006.01)
*G03G 15/00* (2006.01)

(52) U.S. Cl.

CPC ........... *G03G 15/6547* (2013.01); *B65H 7/14* (2013.01); *G03G 15/70* (2013.01); *G03G 21/1609* (2013.01); *B65H 2553/412* (2013.01); *B65H 2553/612* (2013.01)

(58) Field of Classification Search

CPC ............... G03G 15/6547; G03G 15/70; G03G 21/1609; B65H 7/14; B65H 2553/412; B65H 2553/612

See application file for complete search history.

(56) References Cited

U.S. PATENT DOCUMENTS

| | | | | |
|---|---|---|---|---|
| 9,025,973 B2 * | 5/2015 | Suzuki | G03G 21/1633 | 399/21 |
| 2004/0056413 A1 * | 3/2004 | Shirakura | B65H 1/266 | 271/145 |
| 2014/0212152 A1 * | 7/2014 | Suzuki | G03G 21/1633 | 399/16 |
| 2015/0053810 A1 * | 2/2015 | Chang | B65H 26/08 | 242/563 |
| 2015/0239695 A1 * | 8/2015 | Noda | B65H 3/5261 | 271/265.01 |
| 2018/0081314 A1 * | 3/2018 | Suzuki | G03G 15/6511 | |
| 2019/0391525 A1 * | 12/2019 | Kumagai | G03G 15/0121 | |

FOREIGN PATENT DOCUMENTS

| | | |
|---|---|---|
| JP | 2002123048 A | 4/2002 |
| JP | 2009122518 A | 6/2009 |

* cited by examiner

*Primary Examiner* — David H Banh

(74) *Attorney, Agent, or Firm* — Canon U.S.A., Inc. IP Division

(57) ABSTRACT

An image forming apparatus includes a first unit, a second unit fixed to the first unit at a portion upstream of the first unit in a conveyance direction in which the sheet is conveyed, and an electric board. In the image forming apparatus, a disposition of the electric board is restricted by the first unit and the second unit.

20 Claims, 12 Drawing Sheets

IMAGE FORMING APPARATUS

BACKGROUND OF THE INVENTION

Field of the Invention

The present disclosure relates to an image forming apparatus that forms an image on a recording medium.

Description of the Related Art

There is a conventional image forming apparatus in which, when detecting portions that detect a recording medium are provided in a plurality of units, a control board and detection boards are provided as separate boards, and the control board and the detection boards are connected to each other with bundle wire so that the detection boards are disposed directly in the units. By providing the detection hoards in the units, errors regarding the detection accuracy can be reduced.

Furthermore, there is an image forming apparatus in which a plurality of detecting portions are provided on a single board disposed in a direction orthogonal to a conveyance path of the recording medium, and in which the plurality of detecting portions detect to the plurality of unit whether there is a recording medium present (Japanese Patent Laid-Open No. 2002-123048).

Furthermore, there is an apparatus that directly detects whether there is a recording medium present by providing a plurality of detecting portions on a board that has been set close to parallel to a conveyance path of the recording medium (Japanese Patent Laid-Open No. 2009-122518).

However, when a plurality of detecting portions are provided in a single board to achieve cost reduction, and when detection of a presence of a recording medium is performed for a plurality of units, the detection error becomes large when there is a shift between the positions of the units.

SUMMARY OF THE INVENTION

The present disclosure provides an image forming apparatus in which a sheet can be detected accurately with a plurality of detecting portions on the same board, which correspond to a plurality of units.

Further features and aspects of the present disclosure will become apparent from the following description of example embodiments with reference to the attached drawings.

DESCRIPTION OF THE EMBODIMENTS

Figure 1:
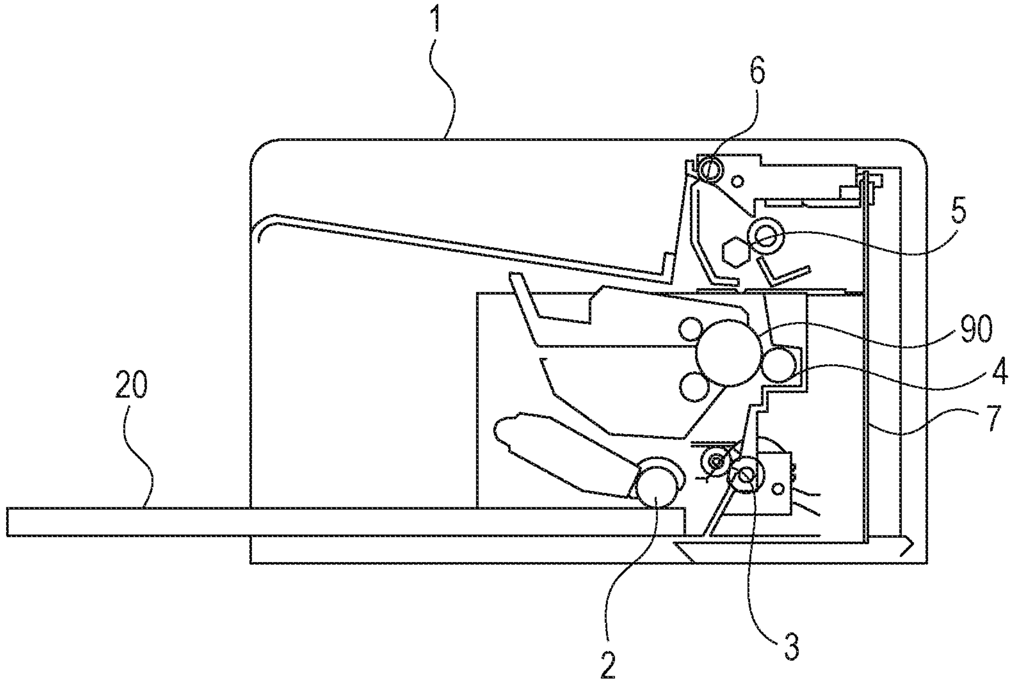
FIG. 1 is a schematic cross-sectional view illustrating a schematic configuration of an example image forming apparatus.

Hereinafter, referring to the drawings, a preferred embodiment of the disclosure will be exemplified in detail. Note that the dimensions, the materials, and the shapes of the components and the relative configuration of the components, and the like that are described in the following embodiment is to be appropriately changed based on the device, to which the present disclosure is applied, and various conditions. Accordingly, unless otherwise specified in particular, the scope of the present disclosure is not intended to be limited by the embodiment described below.

Figure 2:
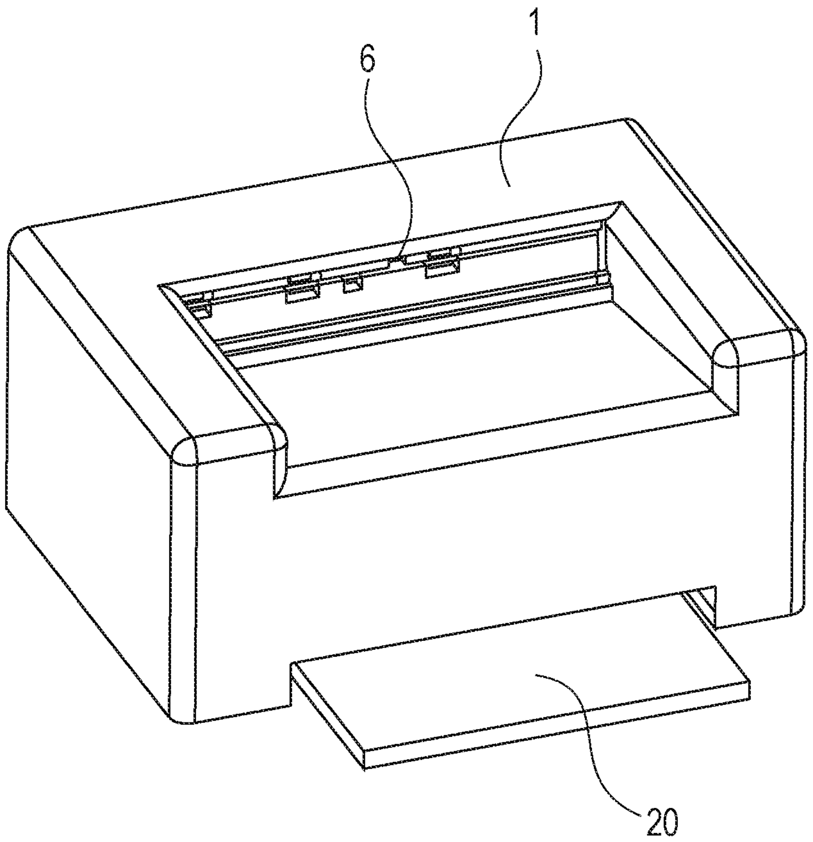
FIG. 2 is a perspective view illustrating the schematic configuration of the image forming apparatus.
Figure 3:
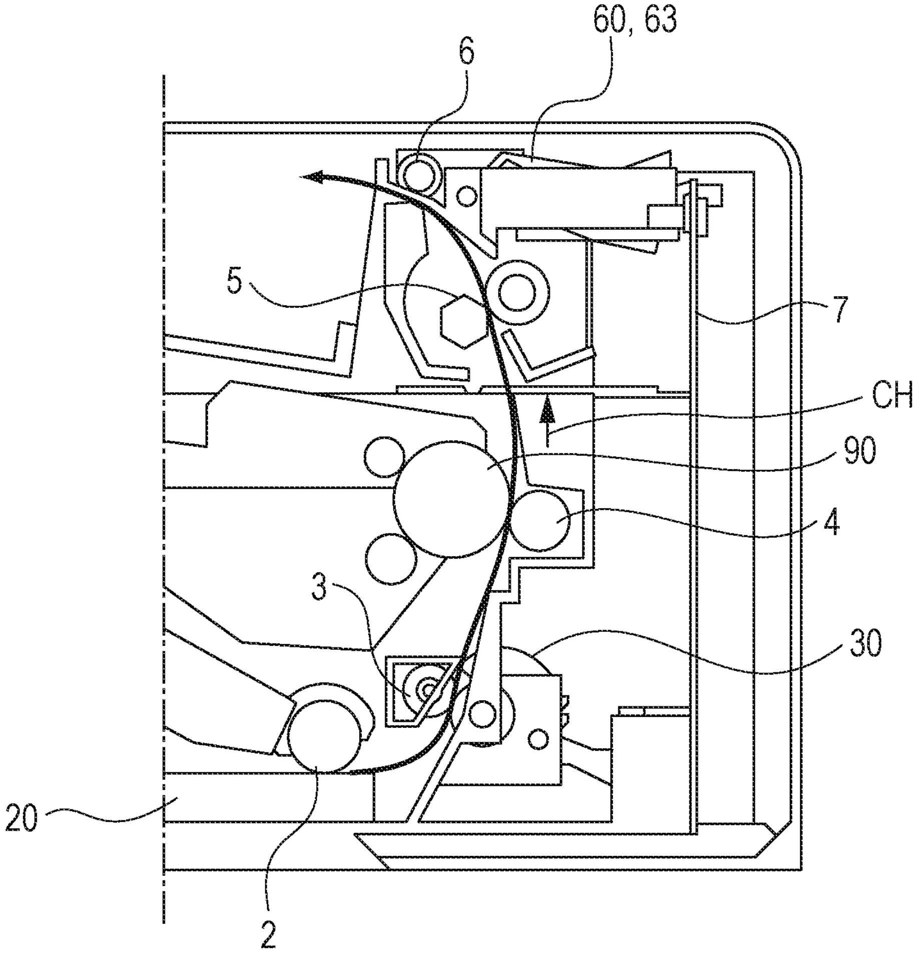
FIG. 3 is a diagram illustrating an example conveyance path of the image forming apparatus.

Referring first to FIGS. 1 to 3, an example image forming apparatus of the present embodiment will be described. FIG. 1 is a cross-sectional view illustrating a schematic configuration of a monochrome laser beam printer that is an example of the image forming apparatus according to the present embodiment, and FIG. 2 is a perspective view of the monochrome laser beam printer. FIG. 3 is a cross-sectional view of the monochrome laser beam printer and is a diagram illustrating a conveyance path of sheets such as recording paper.

An image forming operation of an image forming apparatus 1 will be described briefly. As illustrated in FIGS. 1 to 3, sheets 20 serving as recording mediums stacked on a tray are fed sheet by sheet from the top with a feed roller 2 serving as a feeding portion. Subsequently, the sheet 20 is conveyed further downstream with respect to a conveyance roller 3 serving as a conveying portion and is sent to a transfer portion 4. The transfer portion 4 transfers an image formed on a drum 90 serving as an image bearing member that constitutes an image forming portion onto the conveyed sheet 20. The sheet 20 is sent further downstream and while being conveyed through a fixing portion 5, the image is fixed to the sheet 20 with heat. The sheet 20 is discharged external to the device with discharge rollers 6 serving as a discharge portion.

Figure 4A:
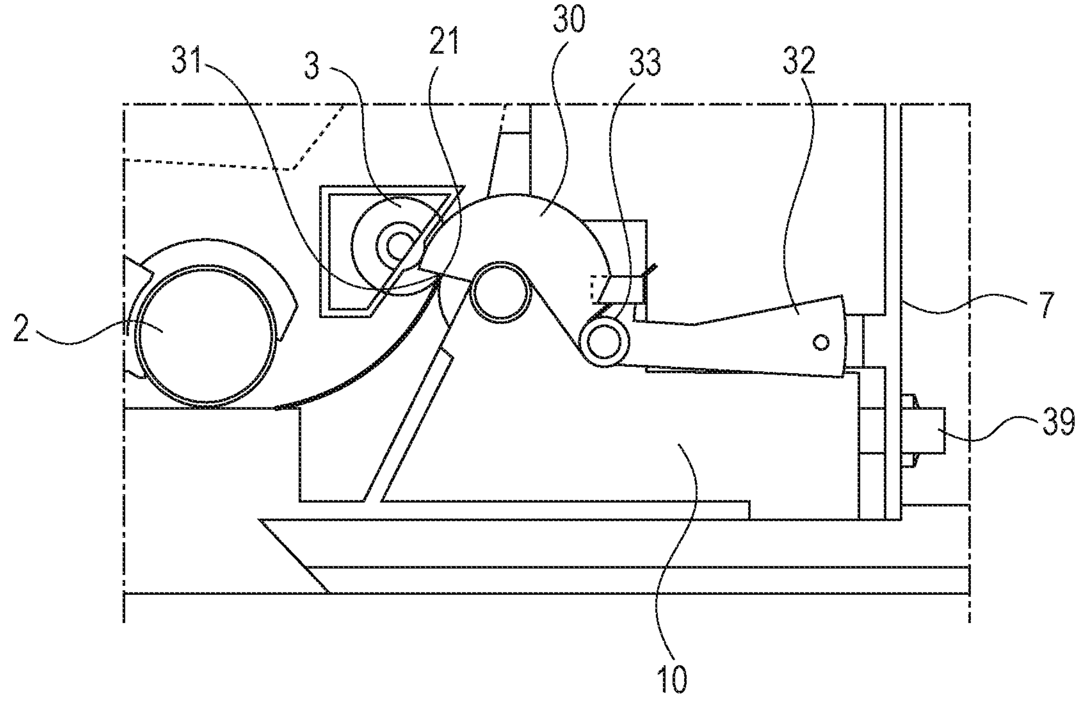
FIGS. 4A and 4B are cross-sectional views illustrating an example operation of a registration detection flag.
Figure 4B:
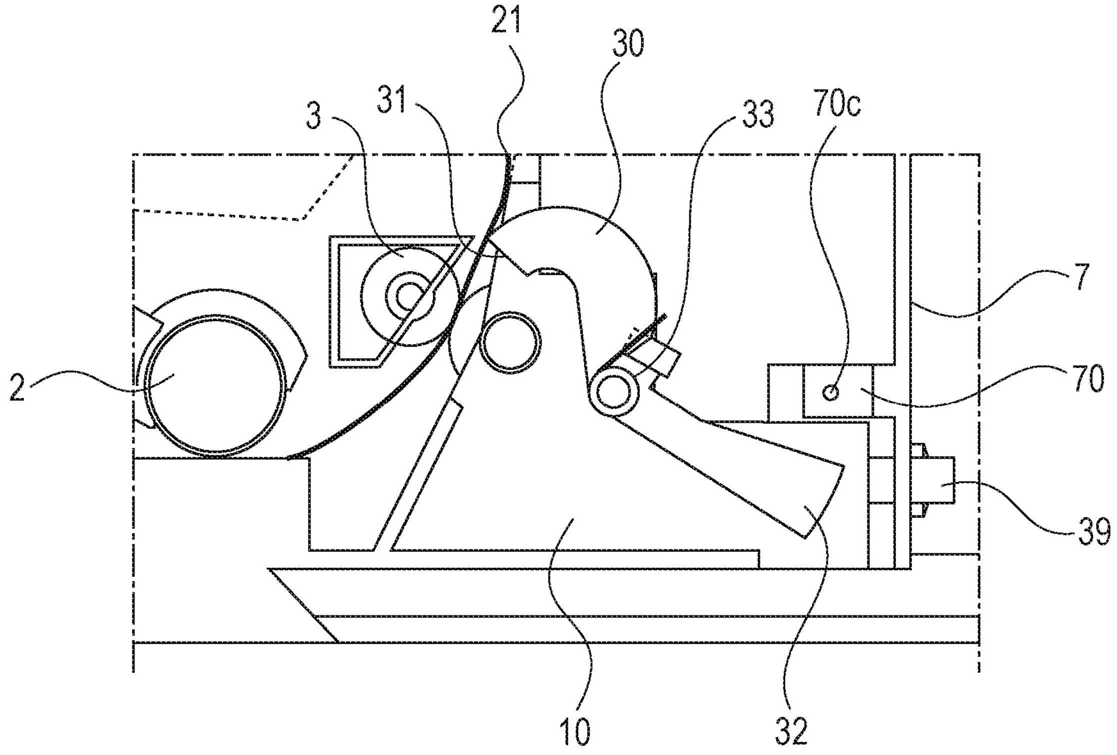
Figure 5A:
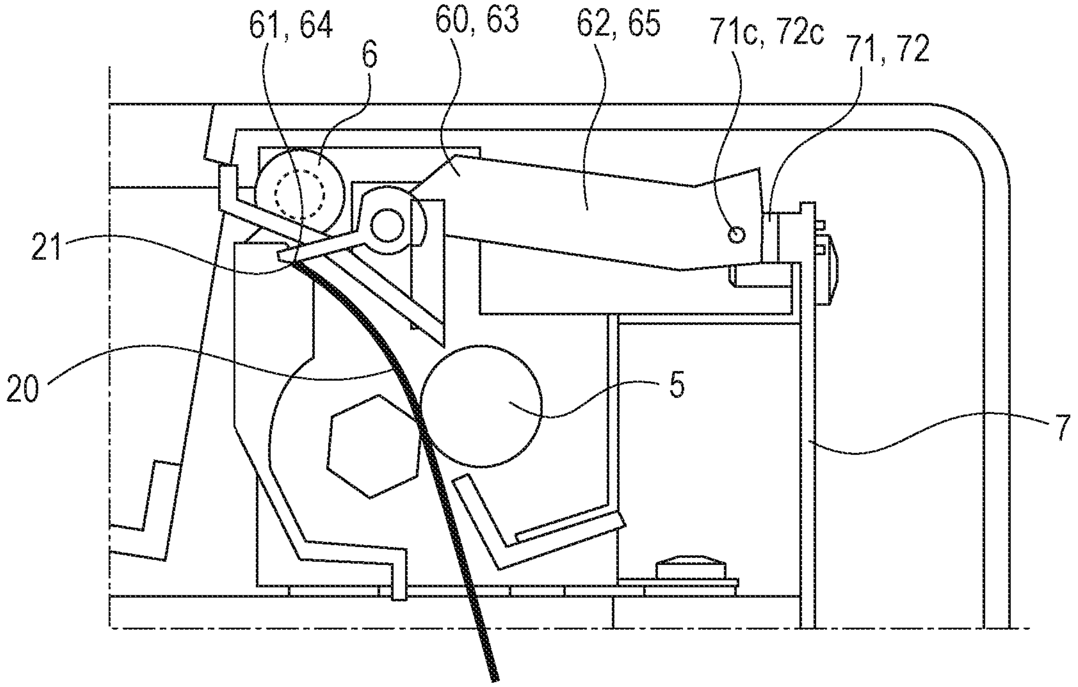
FIGS. 5A and 5B are cross-sectional views for describing example operations of a discharge detection flag and a sheet width detection flag.
Figure 5B:
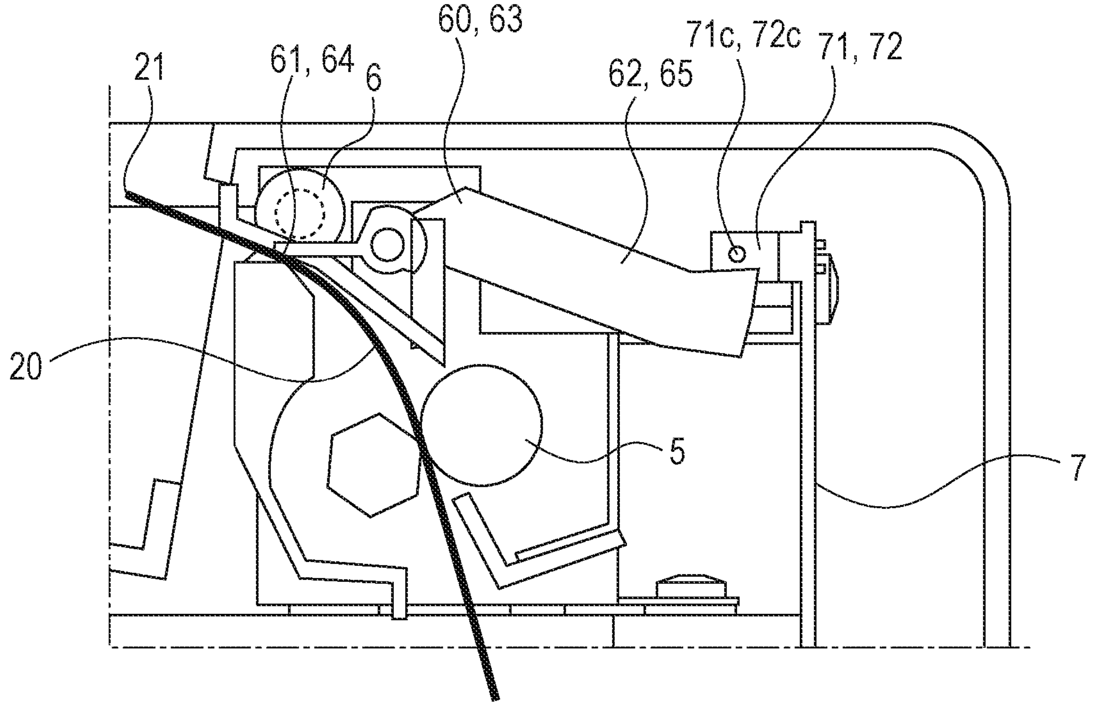
Figure 6:
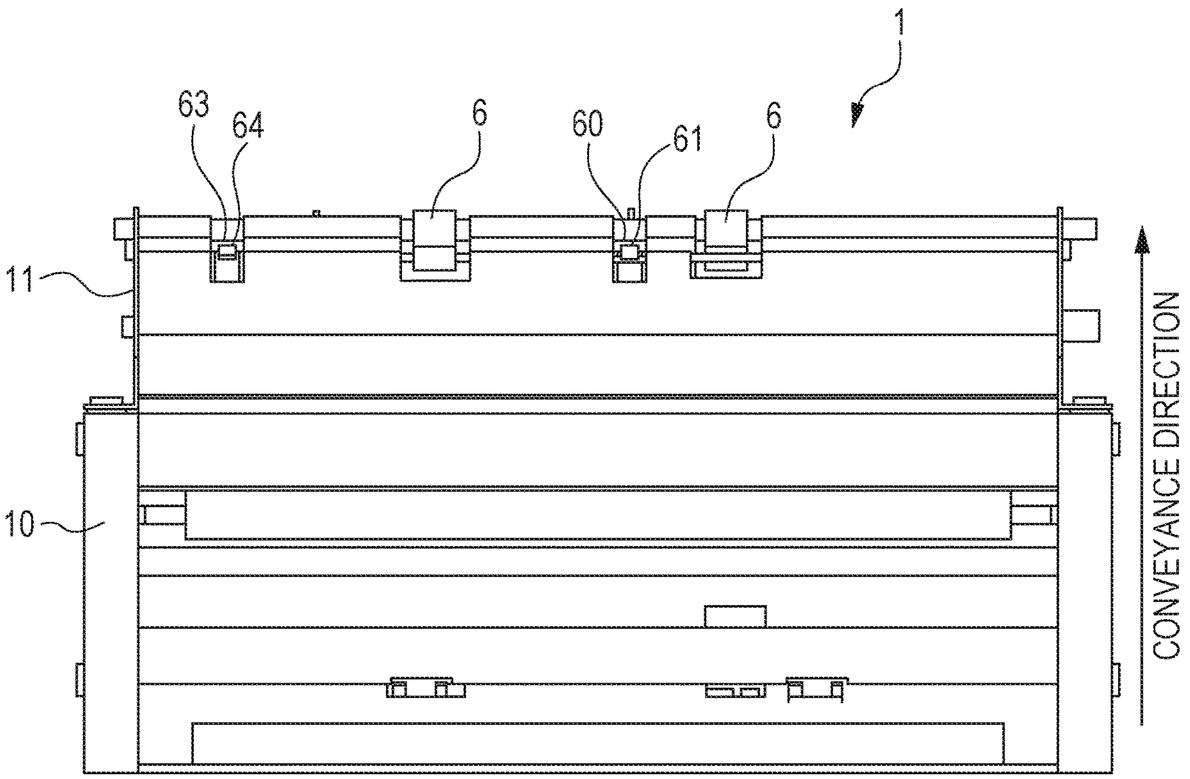
FIG. 6 is a diagram of an inside of the image forming apparatus viewed from a front side.

Referring next to FIGS. 4A to 6, detection of the conveyed sheet 20 will be described. FIGS. 4A and 4B are cross-sectional views for describing an operation of a registration detection flag 30. FIGS. 5A and 5B are cross-sectional views for describing operations of a discharge detection flag 60 and a sheet width detection flag 63. FIG. 6 is a diagram illustrating the inside of the printer viewed from the front side.

As illustrated in FIGS. 4A and 4*b*, the registration detection flag 30 serving as a second pivotably moving member moving pivotably in a conveyance direction is provided between the feed roller 2 and the conveyance roller 3. The registration detection flag 30 is pivoted in the sheet conveyance direction about a rotating shaft 33 by having a front edge 21 of the sheet 20 in the conveyance direction come in contact with a contact portion 31 of the registration detection flag 30 and by being pushed by the sheet 20. The registration detection flag 30 includes a light shielding portion 32 on a side opposite the contact portion 31 with the rotating shaft

33 in between. The light shielding portion 32 of the registration detection flag 30 is switched so that a light of a photointerrupter 70 serving as a second detecting portion disposed on an electric board 7 described later is transmitted or shielded. With the above, the state of the sheet can be detected from a rotation state (a pivot state) of the registration detection flag 30. Note that when in a state in which there is no sheet in the conveyance path, the light is shielded (the state in FIG. 4A) and when in a state in which there is a sheet in the conveyance path, the light is transmitted (the state in FIG. 4B).

As illustrated in FIGS. 5A and 5B, the discharge detection flag 60 serving as a first pivotably moving member and the sheet width detection flag 63 serving as a third pivotably moving member that are moving pivotably in the sheet conveyance direction are provided between the fixing portion 5 and the discharge rollers 6. Similar to the registration detection flag 30 described above, the discharge detection flag 60 and the sheet width detection flag 63 detect the sheet by having the conveyed sheet 20 abut thereagainst and by being pivoted. In other words, the light shielding portion 62 of the discharge detection flag 60 is switched so that a light of a photointerrupter 71 serving as a first detecting portion disposed on the electric board 7 described later is transmitted or shielded. With the above, the state of the sheet can be detected from a rotation state (a pivot state) of the discharge detection flag 60. Similarly, a light shielding portion 65 of the sheet width detection flag 63 is switched so that a light of a photointerrupter 72 serving as a third detecting portion disposed on the electric board 7 described later is transmitted or shielded. With the above, the state of the sheet can be detected from a rotation state (a pivot state) of the sheet width detection flag 63.

As illustrated in FIG. 6, a contact portion 61 of the discharge detection flag 60 is disposed in the vicinity of a middle portion in a width direction that is orthogonal to the sheet conveyance direction. Similar to the registration detection flag 30, the discharge detection flag 60 performs a detection operation of whether there is a sheet by being pivoted in the sheet conveyance direction by having the contact portion 61 of the discharge detection flag 60 be in contact with the front edge of the sheet 20 in the conveyance direction and by having the sheet 20 push the contact portion 61. A contact portion 64 of the sheet width detection flag 63 is disposed in the vicinity of an edge portion in the width direction that is orthogonal to the sheet conveyance direction. The sheet width detection flag 63 performs the sheet detection operation (the state illustrated in FIG. 4B) described above when the width (the length in the width direction) of the sheet is large enough to abut against the contact portion 64. Conversely, in a case in which the width of the sheet is small such that the sheet does not abut against the contact portion 64, the sheet width detection flag 63 does not perform the sheet detection operation since the contact portion 64 does not come into contact with the sheet 20 even if the sheet 20 is conveyed thereto.

An example method of using detection results of the photointerrupters obtained through the detection flags will be described next.

In a case of a monochrome laser printer, after detecting the front edge of the sheet 20 with the registration detection flag 30, formation of an image is started at a predetermined timing so that the position of the image, which is on the transfer portion 4 and which is to be transferred, with respect to the sheet 20 is adjusted. The adjustment is made since there is a variation in the positions of the front edges of the sheet 20 on the tray depending on how the user places the sheets 20 thereon. Accordingly, by starting formation of the image after the front edge 21 of the sheet 20 has been detected, regardless of the position of the sheet 20 placed on the tray, the image can be transferred onto the sheet at a uniform position in the sheet conveyance direction. Furthermore, in a case of a color laser printer, if formation of the image is started after the front edge of the sheet 20 has been detected, the image to be transferred will not reach the image transfer position at the timing at which the sheet 20 is conveyed to the image transfer position; accordingly, the conveyance speed of the sheet 20 is adjusted after the sheet has been detected so that the position at which the image is transferred onto the sheet is uniform. In either case, the transfer position of the image with respect to the sheet is adjusted through the detection of the front edge of the sheet with the registration detection flag 30.

Subsequently, when the discharge detection flag 60 does not detect any sheet after a predetermine time has passed after the front edge 21 of the sheet 20 has been detected with the registration detection flag 30, the discharge detection flag 60 determines that sheet jamming (paper jamming) has occurred and stops the conveyance operation.

Lastly, when the registration detection flag 30 detects a sheet 20 and the sheet width detection flag 63 also, in a similar manner, detects the sheet 20, the sheet width detection flag 63 determines that a large-sized sheet that has a large size in the width direction has been conveyed. On the other hand, in a case in which the registration detection flag 30 detects the sheet 20 and in which the sheet width detection flag 63 does not detect any sheet, the sheet width detection flag 63 determines that a small-sized sheet that has a small size in the width direction compared with the large-sized sheet is conveyed.

As described above, the registration detection flag 30 and the discharge detection flag 60 uses information on the conveying timing of the sheet 20, and the sheet width detection flag 63 uses information on whether there is a sheet 20 present.

As illustrated in FIG. 6, the image forming apparatus 1 according to the present embodiment includes, at a lower side of the apparatus, a transfer portion conveying unit 10 serving as a second unit and, at an upper side of the apparatus, a fixing portion discharge unit 11 serving as a first unit. The second unit is disposed upstream of the first unit in the sheet conveyance direction. The first unit and the second unit are fixed in a direction that is parallel to a portion in the sheet conveyance direction. In the present embodiment, the first unit and the second unit are fixed in the up-down direction and the vertical direction of the apparatus. The transfer portion conveying unit 10 serving as the second unit includes the conveyance roller 3, the transfer portion 4, and the registration detection flag 30 serving as the second pivotably moving member, which are illustrated in FIG. 3. The fixing portion discharge unit 11 serving as the first unit includes the fixing portion 5, the discharge rollers 6, the discharge detection flag 60 serving as the first pivotably moving member, and the sheet width detection flag 63 serving as the third pivotably moving member, which are illustrated in FIG. 3.

Figure 7:
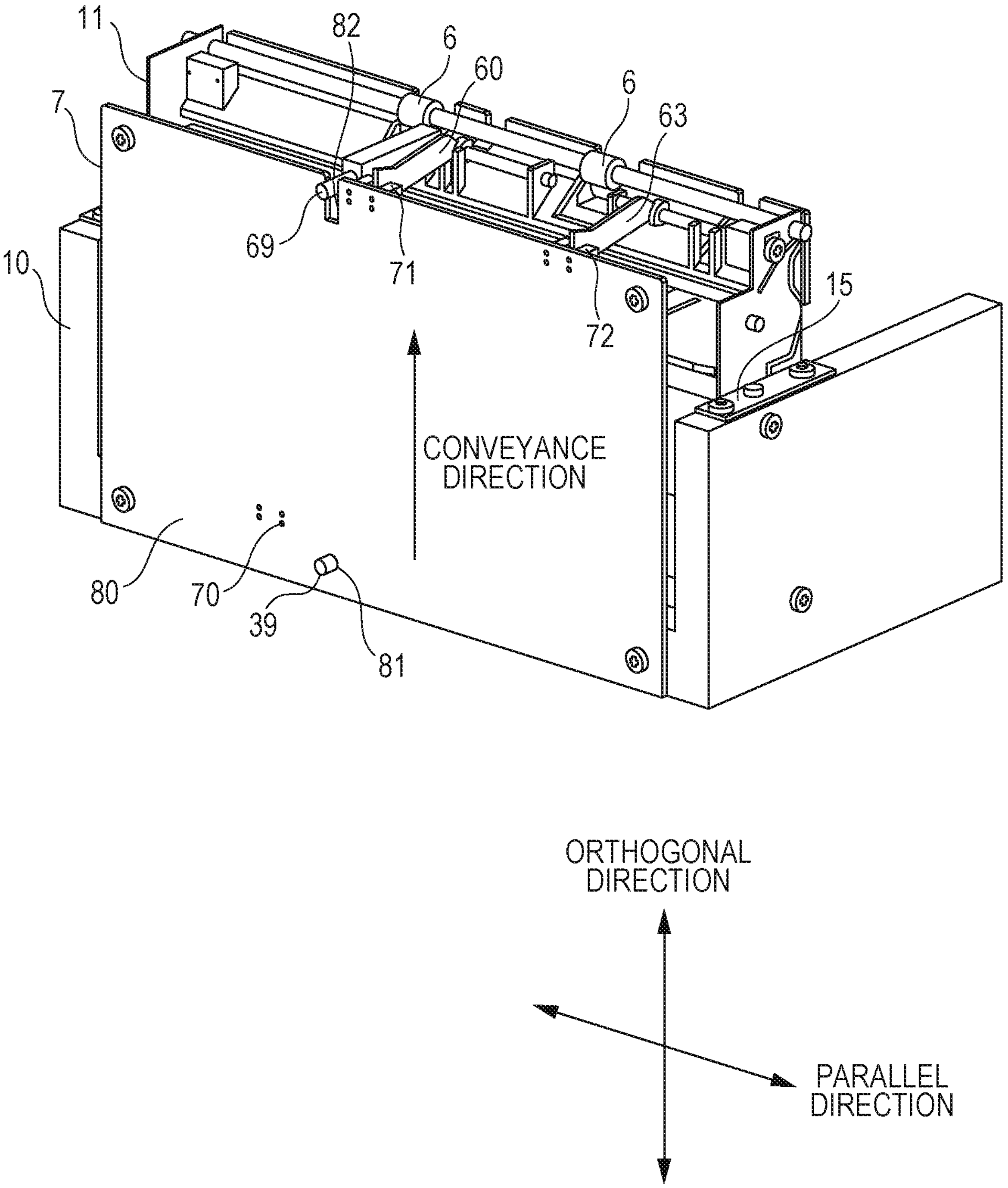
FIG. 7 is a perspective view of an inside of the image forming apparatus viewed from a rear side.

Referring next to FIG. 7, the photointerrupters and the electric board 7 serving as detecting portions corresponding to the detection flags will be described. FIG. 7 is a perspective view of the inside of the printer viewed from the rear side. The electric board 7 includes, on the same plane, the photointerrupter 70 serving as the second detecting portion that detects the sheet conveyed at the transfer portion conveying unit 10, and the photointerrupter 71 serving as the first detecting portion that detects the sheet conveyed at the fixing portion discharge unit 11. Furthermore, in the present embodiment, the electric board 7 includes, on the same surface (on a board surface 80) as those of the photointerrupters 70 and 71, the photointerrupter 72 serving as the third detecting portion that detects the sheet conveyed at the fixing portion discharge unit 11.

The transfer portion conveying unit 10 includes the registration detection flag 30 (see FIG. 3) serving as the second pivotably moving member pivoted by the conveyed sheet, and the photointerrupter 70 detects the sheet, which is conveyed at the transfer portion conveying unit, with the pivoting of the registration detection flag 30. Herein, the photointerrupter 70 detects the front edge of the sheet in the conveyance direction through the registration detection flag 30. The fixing portion discharge unit 11 includes the discharge detection flag 60 serving as the first pivotably moving member pivoted by the conveyed sheet, and the photointerrupter 71 detects the sheet, which is conveyed at the fixing portion discharge unit, through the discharge detection flag 60. Herein, the photointerrupter 71 detects the front edge of the sheet in the conveyance direction through the discharge detection flag 60. The fixing portion discharge unit further includes the sheet width detection flag 63 serving as the third pivotably moving member that is pivoted by the conveyed sheet at a position that is different from the position of the discharge detection flag 60. The photointerrupter 72 detects the sheet that is conveyed at the fixing portion discharge unit 11 through the sheet width detection flag 63. Herein, the size of the sheet in the width direction is detected through the sheet width detection flag 63.

The transfer portion conveying unit 10 includes a second boss 39 that engages with a round hole 81 serving as a second board restricting portion of the electric board 7 and that serves as a second unit restricting portion that restricts the electric board. The second boss 39 extends from the transfer portion conveying unit 10 towards the electric board 7 side. The fixing portion discharge unit 11 includes a first boss 69 that engages with a slit (a slit-shaped hole) 82 serving as a first board restricting portion of the electric board 7 and that first unit restricting portion that restricts the electric board. Similar to the second boss 39, the first boss 69 also extends from the fixing portion discharge unit 11 towards the electric board 7 side.

The electric board 7 includes, at a position that corresponds to the second boss 39 of the transfer portion conveying unit 10, the round hole 81 that engages with the second boss 39 and that serves as the second board restricting portion that restricts the transfer portion conveying unit 10. Furthermore, the electric board 7 includes, at a position that corresponds to the first boss 69 of the fixing portion discharge unit 11, the slit 82 that engages with the first boss 69 and that serves as the first board restricting portion that restricts the fixing portion discharge unit 11.

The electric board 7 is attached to the transfer portion conveying unit 10 and the fixing portion discharge unit 11. The second boss 39 of the transfer portion conveying unit 10 is fitted to the round hole 81 of the electric hoard 7, and the first boss 69 of the fixing portion discharge unit 11 is fitted to the slit 82 of the electric board 7. Note that the round hole 81 and the slit 82 are both provided at substantially the middle in the width direction of the sheet.

Furthermore, as illustrated in FIG. 3, the board surface of the electric board 7 attached to the transfer portion conveying unit 10 and the fixing portion discharge unit 11 is substantially parallel to the sheet that is conveyed at the transfer portion conveying unit 10 and the fixing portion discharge unit 11. In other words, among the conveyance paths of the sheet, the conveyance path that passes a portion next to (or the vicinity of) the electric board 7 is parallel to the board surface of the electric board, and a portion CH in the sheet conveyance direction is parallel to the board surface of the electric board.

Figure 8:
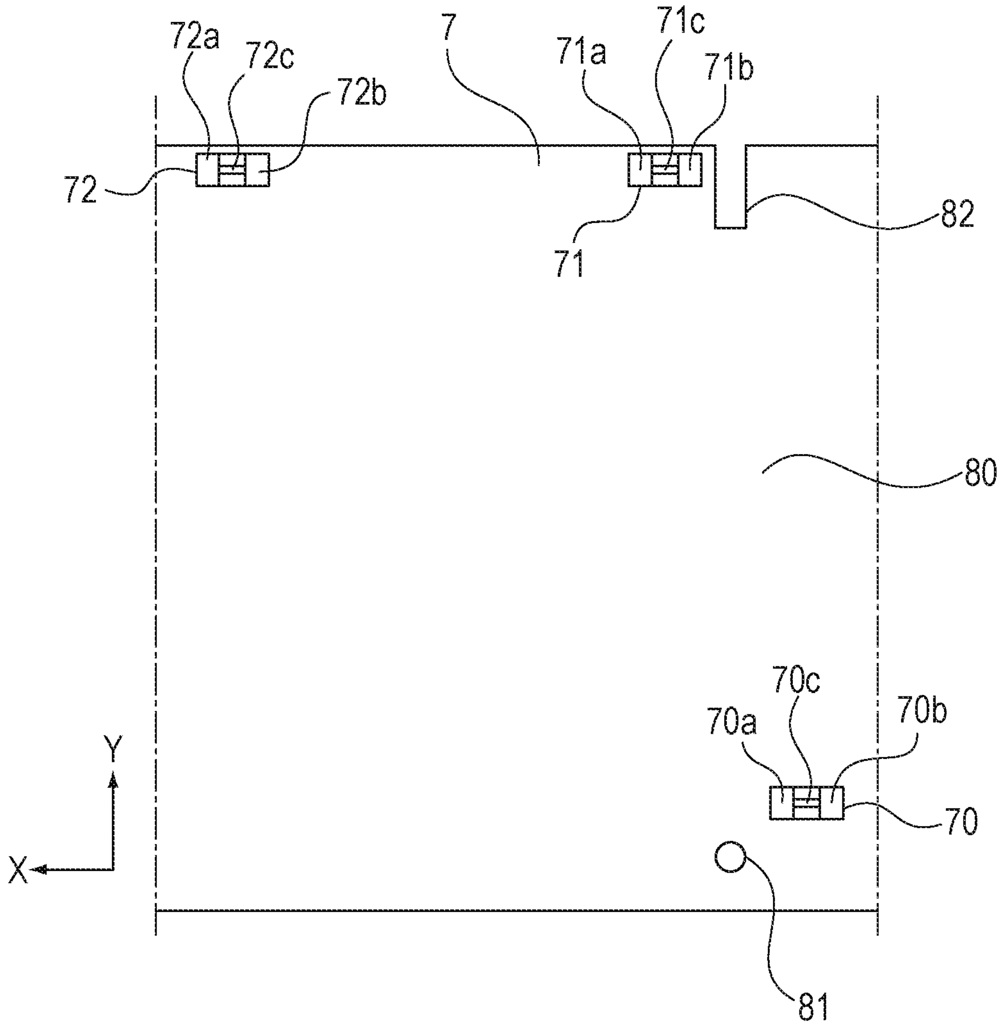
FIG. 8 is a diagram of an example electric board viewed from a front side of the image forming apparatus.

Referring next to FIG. 8, the positional relationships between the round hole 81 and the slit 82 in the electric board 7 and the photointerrupters 70, 71, and 72 will be described. FIG. 8 is a diagram of the electric board 7 viewed from the front side of the printer.

As illustrated in FIG. 8, on the board surface 80 of the electric board 7, the photointerrupter 70 corresponding to the registration detection flag 30 is provided in the vicinity of the round hole 81 corresponding to the transfer portion conveying unit 10. On the board surface 80 of the electric board 7, the photointerrupter 71 corresponding to the discharge detection flag 60 is provided in the vicinity of the slit 82 at the middle corresponding to the fixing portion discharge unit 11. On the board surface 80 of the electric board 7, the photointerrupter 72 corresponding to the sheet width detection flag 63 is, with respect to the photointerrupter 71, provided at a position that is away from the slit 82 corresponding to the fixing portion discharge unit 11.

The photointerrupters 70, 71, and 72 include light emitting portions 70*a*, 71*a*, and 72*a* and light receiving portions 70*b*, 71*b*, and 72*b*, respectively. A direction parallel to an optical axis 71*c* connecting the light emitting portion 71*a* and the light receiving portion 71*b* of the photointerrupter 71 corresponding to the discharge detection flag 60 is referred to as an X direction, and a direction orthogonal to the X direction parallel to the optical axis 71*c* is referred to as a Y direction. In the present embodiment, the X direction extending in the parallel direction and the Y direction that is a direction orthogonal to the parallel X direction are situated inside the plane of the electric board. As described later, the two directions inside the plane of the electric board are restricting directions that restrict the dispositions of the electric board as well.

Figure 9:
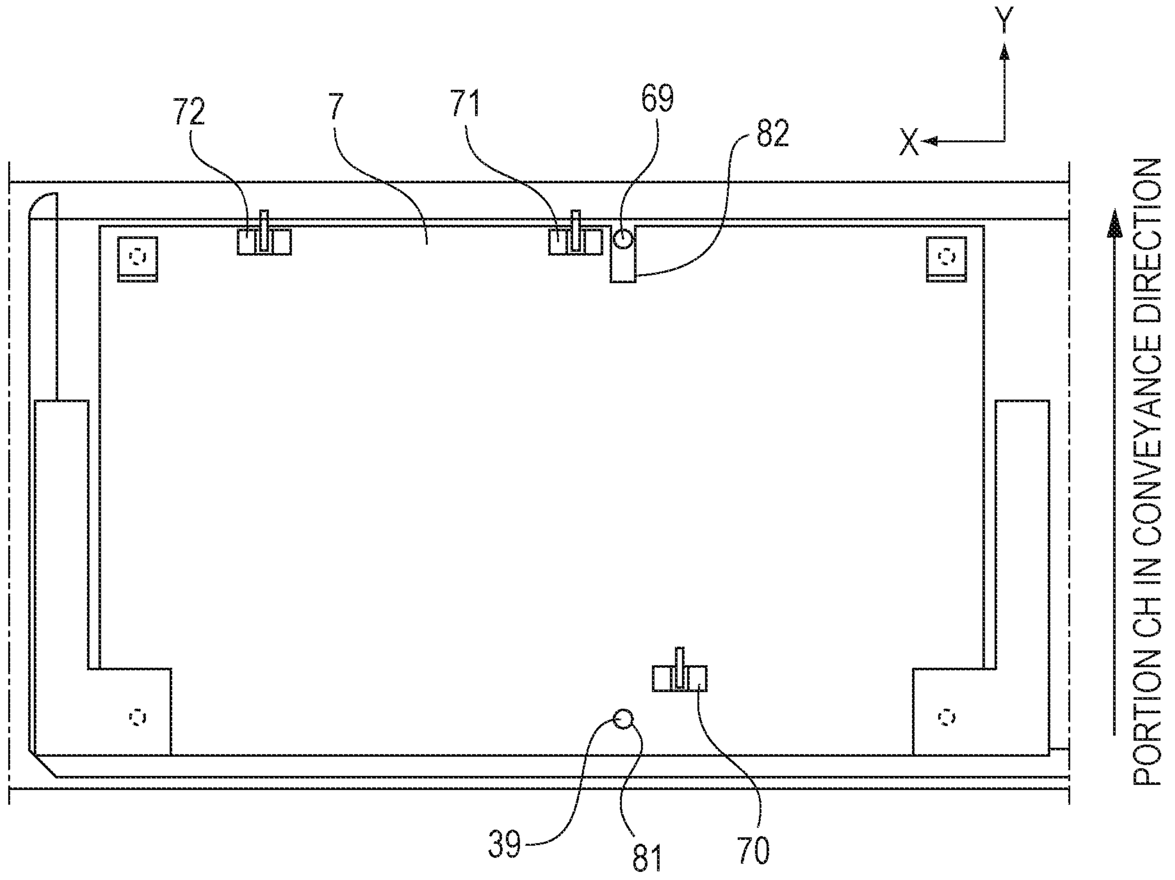
FIG. 9 is a cross-sectional view around the electric board viewed from the front side of the image forming apparatus.

Referring next to FIG. 9, a configuration of restricting the position of the electric board with a plurality of units will be described. FIG. 9 is a cross-sectional view around the electric board 7 viewed from the front side of the printer.

The round hole 81 serving as the second board restricting portion included in the electric board 7 is fitted in the second boss 39 serving as the second unit restricting portion included in the transfer portion conveying unit 10 so that the dispositions of the transfer portion conveying unit 10 and the electric board 7 are restricted in the X direction parallel to and in the Y direction orthogonal to the optical axis (a straight line) connecting the light emitting portion and the light receiving portion. The slit 82 serving as the first board restricting portion included in the electric board is fitted to the first boss 69 serving as the first unit restricting portion included in the fixing portion discharge unit 11 so that the disposition of the fixing portion discharge unit 11 is restricted in the X direction parallel to and in the Y direction orthogonal to the optical axis (a straight line) connecting the light emitting portion and the light receiving portion. In other words, the disposition of the electric board 7 is restricted by the round hole 81 into which the second boss 39 is fitted and the slit 82 into which the first boss 69 is fitted. Furthermore, the electric board 7 restricts the transfer portion conveying unit 10 in the X direction and the Y direction, and restricts the fixing portion discharge unit 11 in the X direction. By having the fixing portion discharge unit 11 be fixed to the transfer portion conveying unit 10 in the Y direction parallel to a portion CH in the conveyance direction of the sheet, the fixing portion discharge unit 11 and the electric board 7 can be assembled with good accuracy even with only the restriction in the X direction.

Put in another way in a state in which the round hole that is the second board restricting portion and the second boss that is the second unit restricting portion are engaged with each other, the disposition of the electric board is regulated in a parallel direction that is parallel to the optical axis connecting the light emitting portion and the light receiving portion of the first detecting portion. Furthermore, the disposition of the electric board is restricted in an orthogonal direction that is parallel to the portion CH in the sheet conveyance direction and that is orthogonal to the optical axis connecting the light emitting portion and the light receiving portion of the first detecting portion. Furthermore, in a state in which the slit that is the first board restricting portion and the first boss that is the first unit restricting portion are engaged with each other, the disposition of the electric board is restricted to a parallel direction that is parallel to the optical axis connecting the light emitting portion and the light receiving portion of the first detecting portion. Note that since the first board restricting portion is a slit-shaped hole that is provided so as to extend in the orthogonal direction that is parallel to the portion CH in the sheet conveyance direction and that is orthogonal to the optical axis connecting the light emitting portion and the light receiving portion of the first detecting portion, the disposition of the electric board is not restricted. In the present embodiment, positions of the first unit and the second unit in the orthogonal direction described above are set by having the first unit and the second unit be fixed with a screw or the like.

With the above, since the fixing portion discharge unit 11 is restricted in the X direction on the upper side of the electric board 7, the positions of the discharge detection flag 60 and the sheet width detection flag 63 in the X direction do not easily shift, and the discharge detection flag 60 and the sheet width detection flag 63 can accurately pass between the light emitting portion and the light receiving portion of the photointerrupter. If the position of the electric board 7 is set by the transfer portion conveying unit 10 alone, when the fixing portion discharge unit 11 shifts in the X direction relative to the transfer portion conveying unit 10, the amount of shifting will be equivalent to the shift between the detection flag and the photointerrupter. When the amount of shifting is large, the discharge detection flag 60 and the sheet width detection flag 63 may become out of place with respect to the light emitting portion and the light receiving portion of the photointerrupter and there may be cases in which the sheet cannot be detected.

Figure 12:
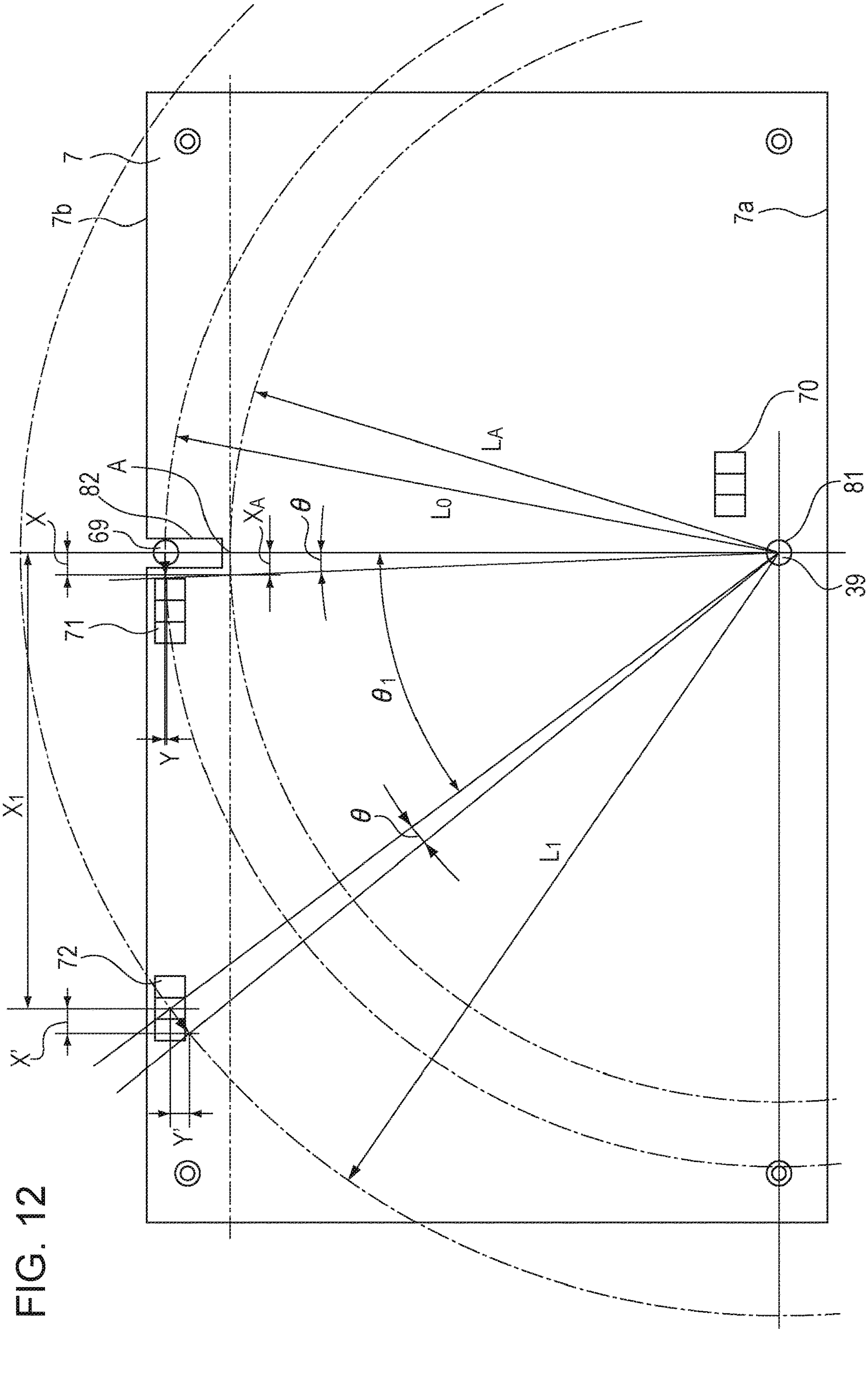
FIG. 12 is a diagram of the electric board viewed from the front side of the image forming apparatus.

FIG. 12 is a diagram of the electric board 7 viewed from the front side of the printer front. When the fixing portion discharge unit 11 is shifted in the X direction by a shifting amount X relative to the transfer portion conveying unit 10, the slit 82 of the electric board 7 is shifted in the X direction by the shifting amount X in a similar manner. Accordingly, the electric board 7 rotates about the fitting portion between the round hole 81 of the transfer portion conveying unit 10 and the second boss 39 of the transfer portion conveying unit 10. When the rotational angel in the above case is θ, the photointerrupter 72 is also rotated by the same angle θ.

Referring to FIG. 12, $L_0$ denotes a distance in the electric board 7 between the second boss 39 of the transfer portion conveying unit 10 and the first boss 69 of the fixing portion discharge unit 11, and $L_1$ denotes a distance in the electric board 7 between the photointerrupter 72 corresponding to the sheet width detection flag 63 and the second boss 39 of the transfer portion conveying unit 10. With the calculation below, a moving amount X' of the photointerrupter 72 when there is a shift in the X direction by the shifting amount X can be obtained. Note that regarding a moving amount Y' of the photointerrupter 72 relative to a shift in the Y direction by a shifting amount Y is not considered herein since the direction is the same as a moving direction (pivoting direction) of the sheet width detection flag 63 corresponding to the photointerrupter 72.

$$\sin \theta = X/L_0$$

$$\theta = A \sin(X/L_0)$$

$$\sin(\theta+\theta_1) = (X_1+X')/L_1$$

$$X' = L_1 \times \sin(\theta+\theta_1) - X_1$$

On the other hand, the sheet width detection flag 63 provided in the fixing portion discharge unit 11 shifts together with the fixing portion discharge unit 11 in an integral manner by the shifting amount X; accordingly, the relative shift amount between the sheet width detection flag 63 and the photointerrupter 72 corresponding to the sheet width detection flag 63 is X−X'.

Supposing that a movement of a point A situated on a straight line connecting the second boss 39 and the first boss 69 is considered. A moving distance $X_A$ of point A moving in the X direction is $X=(L_0/L_A)\times X_A$. It can be understood that $X_A$ is proportional to X by a ratio between $L_0$ and $L_A$.

In other words, for example, suppose $L_0:L_A=10:9$ holds true. Then, in the straight line connecting the second boss 39 and the first boss 69, the distance $L_A$ between the second boss 39 and point A is 0.9 times the length (a radius) of distance $L_0$ between the second boss 39 and the first boss 69. In such a case, the shifting amount of the fixing portion discharge unit and the shifting amount of the photointerrupter are also 10:9, and the relative shifting amount is $X-X_A=X\times 10\%$. The above is referred to as an attenuation factor of 10% with respect to the shifting amount of the fixing portion discharge unit. It has been understood that when the points that satisfy X−X'=X×10% are plotted, the attenuation factor 10% is, with respect to the lines (the dot and dash lines in FIG. 12) tangent to the circle of $L_A$ extended in the optical axis direction, the area away from the second boss 39 on the first boss 69 side. The above area is referred to as an attenuation-factor-10% area.

If the shifting amount of the fixing portion discharge unit with respect to the transfer portion conveying unit is 1 mm, then, the relative shifting amount between the flag and the photointerrupter in the X direction will be 0.1 mm when the photointerrupter is installed in the attenuation-factor-10% area. Accordingly, it can be said that there is almost no possibility of not being able to detect the sheet when shifted in the X direction.

The attenuation-factor-10% area of the photointerrupter 70 corresponding to the registration detection flag 30 will be discussed next. The detection of the sheet with the photointerrupter 70 through the registration detection flag 30 needs to be accurate in both the X direction and the Y direction. The area in which the shift in the X direction and the shift in the Y direction are both 10% is the area surrounded by a circle about the second boss 39 having a radius of $L_0\times 0.1$. When the radius, which is the shortest straight line connecting the second boss 39 and the photointerrupter 70, is small, the attenuation-factor-10% area described above becomes narrow. Accordingly, when the photointerrupter 70 cannot be disposed inside the circle, it is desirable that electric elements (chip, capacitor, etc.) other than the photointerrupter 70 be removed and the photointerrupter 70 be disposed as close as possible to the second boss 39.

In the present embodiment, the photointerrupter 70 that is the second detecting portion is provided in the vicinity of the round hole 81 that is the second board restricting portion of the electric board 7. More specifically, there is no electric elements on the flat surface of the electric board 7 other than the second detecting portion (other than the photointerrupter 70) on a shortest straight line connecting the photointerrupter 70 and the boss 39.

Similarly, the photointerrupter 71 that is the first detecting portion is provided in the vicinity of the slit 82 that is the first board restricting portion of the electric board 7. More specifically, there is no electric elements on the flat surface of the electric board 7 other than the first detecting portion (other than the photointerrupter 71) on a shortest straight line connecting the photointerrupter 71 and the boss 69.

Furthermore, since the attenuation factor of the shift becomes small when the radius $L_0$ becomes large, it is desirable that the electric elements be removed and the round hole 81 and the slit 82 be disposed close to a board edge surface of the electric board.

In the present embodiment, there is no electric element between the round hole 81 of the electric board 7 and an electric board edge surface 7*a* in the vicinity of the round hole 81. Furthermore, there is no electric element between the slit 82 of the electric board 7 and an electric board edge surface 7*b* that is situated in the vicinity of the slit 82 and that is an electric board edge surface on the other side that opposes the electric board edge surface 7*a*. The electric board 7 according to the present embodiment is configured in the above manner. With the above, the attenuation-factor-10% area described above can be made narrow, and even in a case in which one of the units becomes shifted relative to the other unit, the sheet detection with the photointerrupter through the flag can be performed accurately. Note that the electric board edge surface 7*a* situated in the vicinity of the round hole 81 and that is one of the edge surfaces of the electric board 7 is an edge surface on the upstream side in the sheet conveyance direction, and the electric board edge surface 7*b* situated in the vicinity of the slit 82 and that is the other edge surface of the electric board 7 is an edge surface on the downstream side in the sheet conveyance direction.

Figure 10:
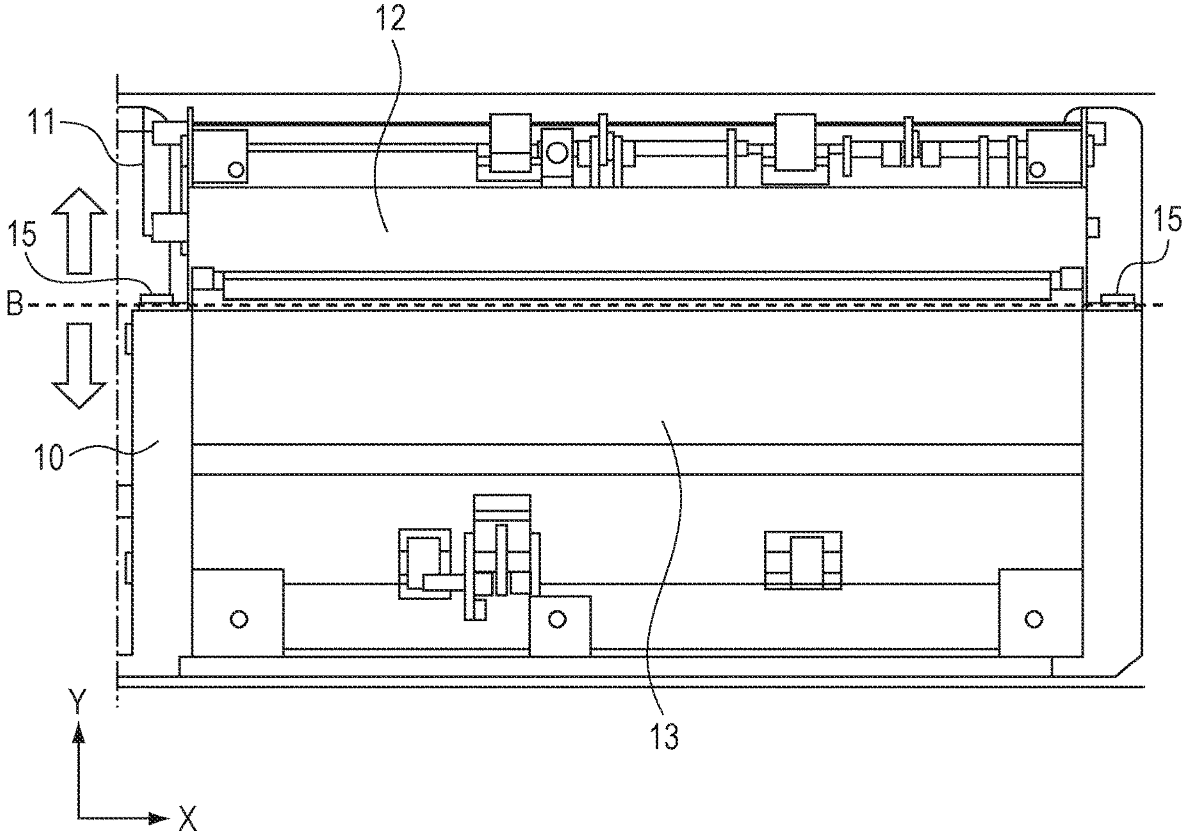
FIG. 10 is a diagram of an inside of the image forming apparatus viewed from the rear side.

Referring next to FIG. 10, the positions of the photointerrupters provided on the electric board 7 will be described. FIG. 10 is a diagram illustrating the inside of the printer viewed from the rear side. In FIG. 10, a straight line connecting the connections between the transfer portion conveying unit 10 and the fixing portion discharge unit 11 is depicted as a broken line B. Having the broken line B as a boundary, a transfer portion conveying unit area 13 is below the broken line B in FIG. 10 and a fixing portion discharge unit area 12 is above the broken line.

The photointerrupter 70 corresponding to the registration detection flag 30 is situated in the transfer portion conveying unit area 13. In other words, the photointerrupter 70 that is the second detecting portion is in the area 13 in the electric board 7 that includes the round hole 81 (see FIG. 9) that is the second board restricting portion that restricts the transfer portion conveying unit. Meanwhile, the photointerrupter 73 corresponding to the discharge detection flag 60 and the photointerrupter 74 corresponding to the sheet width detection flag 63 are situated in the fixing portion discharge unit area 12. In other words, the photointerrupter 71 that is the first detecting portion and the photointerrupter 72 that is the third detecting portion are in the area 12 in the electric board including the slit that is the first board restricting portion 82 (see FIG. 9) that restricts the fixing portion discharge unit.

Furthermore, as illustrated in FIGS. 4A and 4B, the photointerrupter 70 corresponding to the registration detection flag 30 is positioned between the contact portion 31 of the registration detection flag 30 and the second boss 39 that is the second unit restricting portion of the transfer portion conveying unit 10 in which the position of the transfer portion conveying unit 10 is regulated by the electric board 7.

Figure 11A:
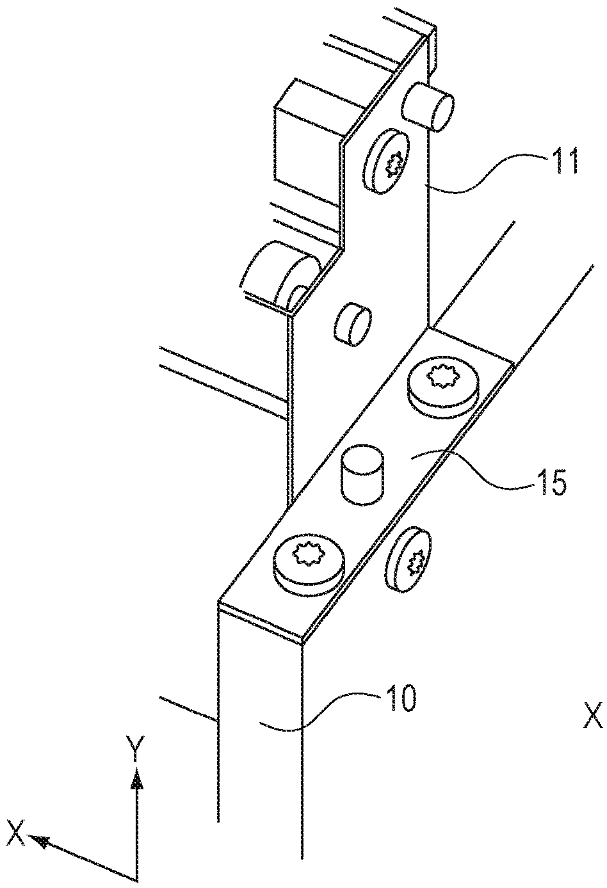
FIGS. 11A to 11C are diagrams illustrating a connection between a transfer portion conveying unit and a fixing portion discharge unit.
Figure 11B:
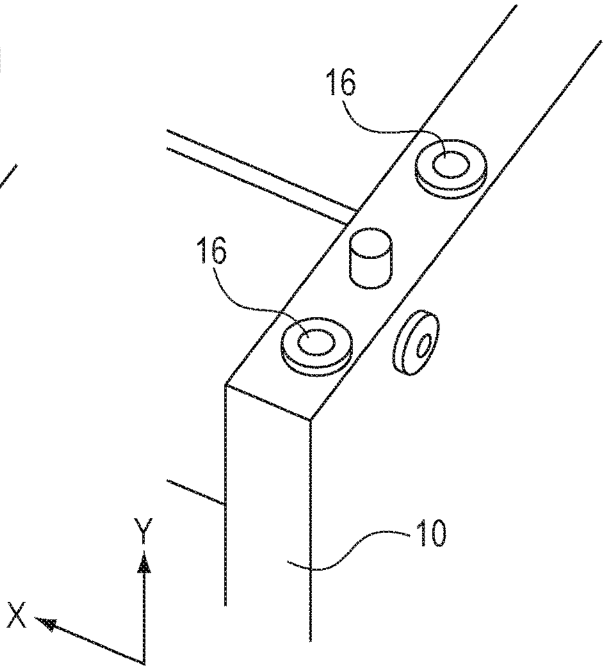
Figure 11C:
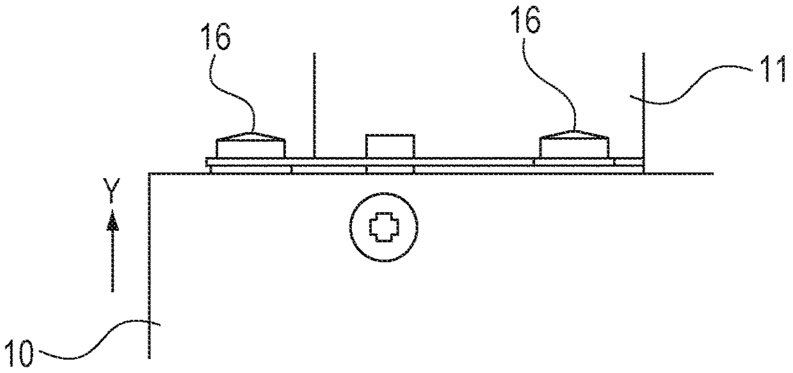

Furthermore, FIGS. 11A, 11B, and 11C are diagrams illustrating one of connections 15 between the transfer portion conveying unit 10 and the fixing portion discharge unit 11. As illustrated in FIG. 11A, the fixing portion discharge unit 11 is fastened by screws in the Y direction with respect to the transfer portion conveying unit 10. As illustrated in FIG. 11B, the transfer portion conveying unit 10 includes screw fastening surfaces 16, and as illustrated in FIG. 11C, the connections 15 between the transfer portion conveying unit 10 and the fixing portion discharge unit 11 are connected without any gap. Herein, in the conveyance direction in which the sheet is conveyed, the fixing portion discharge unit 11 that is the first unit is fixed downstream of the transfer portion conveying unit 10 that is the second unit.

As described above, the position of the electric board, which includes a plurality of detecting portions, is set relative to the plurality of units that correspond to the detecting portions. Furthermore, the positioning directions between the units are set to match the directions of the detecting portions. With the above, a sheet can be detected accurately with the plurality of detecting portions on the same board, which correspond to the plurality of units.

Note that in the embodiment described above, as illustrated in FIG. 8, the photointerrupter 71 corresponding to the discharge detection flag 60 is provided in the vicinity of the slit 82 at the middle corresponding to the fixing portion discharge unit 11. Meanwhile, the photointerrupter 72 corresponding to the sheet width detection flag 63 is, with respect to the photointerrupter 71, provided at a position that is away from the slit 82 corresponding to the fixing portion discharge unit 11. In other words, the photointerrupter 71 corresponding to the discharge detection flag 60 has been exemplified as the first detecting portion that detects the edge portion in the sheet conveyance direction, and a configuration in which the above photointerrupter 71 is provided in the vicinity of the slit that is the first board restricting portion 82 has been exemplified; however, the configuration is not limited to the above exemplifications. The first detecting portion may be the photointerrupter 72 corresponding to the sheet width detection flag 63 that detects the size of the sheet in the width direction, and the above photointerrupter 72 may be provided in the vicinity of the slit that is the first board restricting portion 82. Furthermore, the photointerrupter 71 corresponding to the discharge detection flag 60 may be the third detecting portion, and may be, with respect to the photointerrupter 72, provided at a position that is away from the slit 82 corresponding to the fixing portion discharge unit 11. From another viewpoint, the third detecting portion is disposed at the following position. First, there is a circle about the second boss that is the second unit restricting portion in which a radius thereof has a length that is 0.9 times a distance between the second unit restricting portion and the first boss that is the first unit restricting portion. There is a first boundary line that is tangent to the circle and that is orthogonal to a line connecting the second unit restricting portion and the first unit restricting portion. Furthermore, there is a second boundary line that is an edge portion of the electric board on the side on which a second fitting portion is provided. The third detecting portion is disposed between the first boundary line and the second boundary line.

Furthermore, in the embodiment described above, a configuration has been exemplified in which each member includes a pivotably moving member (a detection flag) that is pivoted by the conveyed sheet and in which each detecting portion detects the sheet by the pivoting of the pivotably moving member; however, the configuration is not limited to such a configuration. For example, openings may be provided at positions in the units corresponding to the detecting portions of the electric board and the sheet may be detected by the detecting portions through the openings.

Furthermore, in the embodiment described above, a configuration in which one detecting portion which detects the sheet conveyed at the transfer portion conveying unit that is the second unit is disposed, and in which two detecting portions which detect the sheet conveyed at the fixing portion discharge unit that is the first unit are disposed has been exemplified. However, the present disclosure is not limited to the above configuration. It is only sufficient that the electric board, the position of which is restricted by a plurality of units, includes at least one detecting portion corresponding to each unit. Furthermore, the number of detecting portions is not limited to three and can be provided accordingly according to the necessity.

Furthermore, in the embodiment described above, the transfer portion conveying unit has been exemplified as the second unit, and the fixing portion discharge unit as the first unit that is screwed to the transfer portion conveying unit has been exemplified; however, the configuration is not limited to the above. The configuration may be other combinations as long as the sheet is conveyed such as, for example, a configuration in which the feeding portion that separates and feeds the sheet and the conveying portion that conveys the sheet are connected to each other.

Furthermore, in the example embodiment described above, the printer has been exemplified as an image forming apparatus; however, the configuration is not limited to the above. For example, the image forming apparatus may be another image forming apparatus such as a copying machine or a facsimile machine, or a multi-functional apparatus that combines a plurality of the above functions. Similar effects can be obtained by applying the present disclosure to such image forming apparatuses.

In the embodiment described above, a configuration has been exemplified in which the image forming apparatus includes the plurality of units that convey the sheet, such as recording paper, that is a printing object; however, the present disclosure is not limited to the above. For example, a similar effect can be obtained when the present disclosure is used in an image forming apparatus that includes an image reading device that includes a plurality of units that convey a sheet, such as an original, that is the reading object. Alternatively, a similar effect can be obtained when the present disclosure is used in an image forming apparatus that includes a sheet processing device that includes a plurality of units that performs stapling or the like of sheets, such as recording paper, that are the recording object.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2017-187433 filed Sep. 28, 2017 and No. 2018-139976 filed Jul. 26, 2018, which are hereby incorporated by reference herein in their entirety.

What is claimed is:

1. An image forming apparatus that forms an image on a sheet, the image forming apparatus comprising:

a first unit;

a second unit fixed to the first unit at a portion upstream of the first unit in a conveyance direction in which the sheet is conveyed; and an electric board that includes, on a same surface thereof, at least a first detecting portion that detects the sheet conveyed at the first unit and a second detecting portion that detects the sheet conveyed at the second unit, wherein the first unit includes a first unit restricting portion that restricts a disposition of the electric board, wherein the second unit includes a second unit restricting portion that restricts a disposition of the electric board, wherein the electric board includes a first board restricting portion that engages with the first unit restricting portion, and a second board restricting portion that engages with the second unit restricting portion, wherein in a state in which the first unit restricting portion and the first board restricting portion are engaged with each other, the disposition of the electric board is restricted in a parallel direction that is parallel to an optical axis connecting a light emitting portion and a light receiving portion included in the first detecting portion, and wherein in a state in which the second unit restricting portion and the second board restricting portion are engaged with each other, the disposition of the electric board is restricted in the parallel direction, and the disposition of the electric board is restricted in an orthogonal direction that is parallel to a portion in the conveyance direction and that is orthogonal to the optical axis.

2. An image forming apparatus that forms an image on a sheet, the image forming apparatus comprising:

a first unit;

a second unit fixed to the first unit at a portion upstream of the first unit in a conveyance direction in which the sheet is conveyed; and an electric board that includes, on a same surface thereof, at least a first detecting portion that detects the sheet conveyed at the first unit and a second detecting portion that detects the sheet conveyed at the second unit, wherein the first unit includes a first boss, wherein the second unit includes a second boss, wherein the electric board including a slit that engages with the first boss, and a hole that engages with the second boss, wherein in a state in which the first boss and the slit are engaged with each other, the disposition of the electric board is restricted in a parallel direction that is parallel to an optical axis connecting a light emitting portion and a light receiving portion included in the first detecting portion, and wherein in a state in which the second boss and the hole are engaged with each other, the disposition of the electric board is restricted in the parallel direction, and the disposition of the electric board is restricted in an orthogonal direction that is parallel to a portion in the conveyance direction and that is orthogonal to the optical axis.

3. The image forming apparatus according to claim 1,
wherein the first detecting portion is provided in a vicinity of the first board restricting portion, and the second detecting portion is provided in a vicinity of the second board restricting portion.

4. The image forming apparatus according to claim 1,
wherein the first unit includes a first pivotably moving member that is pivoted by the sheet that is conveyed,
wherein the second unit includes a second pivotably moving member that is pivoted by the sheet that is conveyed,
wherein, with the pivoting of the first pivotably moving member, the first detecting portion detects the sheet conveyed to the first unit, and
wherein, with the pivoting of the second pivotably moving member, the second detecting portion detects the sheet conveyed to the second unit.

5. The image forming apparatus according to claim 1,
wherein the electric board further includes, on the same surface thereof, a third detecting portion that detects the sheet conveyed by the first unit, and
wherein the third detecting portion is provided at a position away from the first board restricting portion with respect to the first detecting portion.

6. The image forming apparatus according to claim 5,
wherein the first unit further includes a third pivotably moving member that is pivoted at a position different from that of the first pivotably moving member by the sheet that is conveyed, and
wherein, with the pivoting of the third pivotably moving member, the third detecting portion detects the sheet conveyed at the first unit.

7. The image forming apparatus according to claim 1,
wherein there is no electric element other than the first detecting portion on a shortest straight line connecting the first detecting portion and the first restricting portion.

8. The image forming apparatus according to claim 1,
wherein there is no electric element other than the second detecting portion on a shortest straight line connecting the second detecting portion and the second restricting portion.

9. The image forming apparatus according to claim 1,
wherein the first unit includes a first fitting portion fitted to the first board restricting portion of the electric board, and the second unit includes a second fitting portion fitted to the second board restricting portion of the electric board.

10. The image forming apparatus according to claim 1,
wherein there is no electric element between the first board restricting portion of the electric board and an electric board edge surface in a vicinity of the first board restricting portion.

11. The image forming apparatus according to claim 1,
wherein there is no electric element between the second board restricting portion of the electric board and an electric board edge surface in a vicinity of the second board restricting portion.

12. The image forming apparatus according to claim 1,
wherein the third detecting portion is provided in a vicinity of an edge portion on a side of the electric board in which the first board restricting portion is provided.

13. The image forming apparatus according to claim 9,
wherein the second detecting portion is, in a vertical direction, positioned between the second pivotally moving member that comes in contact with the sheet and the second board restricting portion.

14. The image forming apparatus according to claim 1,
wherein the second unit includes a transfer portion that transfers an image formed on an image bearing member onto the sheet,
wherein the second detecting portion is positioned upstream of the transfer portion in the conveyance direction of the sheet, and
wherein a position of an image with respect to the sheet to which the image is transferred from the transfer portion is adjusted using a timing at which the sheet has been detected by the second detecting portion.

15. The image forming apparatus according to claim 1,
wherein the first unit includes a fixing portion that fixes the image transferred to the sheet, and
wherein the first detecting portion is positioned downstream of the fixing portion in the conveyance direction of the sheet.

16. The image forming apparatus according to claim 1,
wherein the optical axis connecting the light emitting portion and the light receiving portion is orthogonal to the conveyance direction of the sheet.

17. The image forming apparatus according to claim 1,
wherein a board surface of the electric board is parallel to the sheet conveyed at the first unit and the second unit.

18. The image forming apparatus according to claim 1,
wherein when a boundary is set with a connection connecting the first unit and the second unit,
the first detecting portion is an area including a first restricting portion in which the electric board is restricted by the first unit, and
the second detecting portion is an area including a second restricting portion in which the electric board is restricted by the second unit.

19. The image forming apparatus according to claim 5,
wherein when a boundary is set with a connection connecting the first unit and the second unit,
the third detecting portion is an area including a first restricting portion in which the electric board is restricted by the first unit.

20. The image forming apparatus according to claim 5,
wherein the third detecting portion is disposed between a line and an edge portion of the electric board on a side in which the second fitting portion is provided, the line being tangent to a circle about the second unit restricting portion having a radius that is 0.9 times a distance between the second unit restricting portion and the first unit restricting portion and being orthogonal to a line connecting the second unit restricting portion and the first unit restricting portion to each other.

* * * * *